United States Patent
Wakui

(10) Patent No.: US 10,761,295 B2
(45) Date of Patent: Sep. 1, 2020

(54) IMAGE FOCUSING DEVICE, IMAGE FOCUSING METHOD AND COMPUTER READABLE MEDIUM WITH IMAGE FOCUSING CONTROL PROGRAM

(71) Applicant: FUJIFILM Corporation, Minato-ku, Tokyo (JP)

(72) Inventor: Takashi Wakui, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 11 days.

(21) Appl. No.: 16/219,193

(22) Filed: Dec. 13, 2018

(65) Prior Publication Data
US 2019/0121058 A1    Apr. 25, 2019

Related U.S. Application Data

(63) Continuation of application No. PCT/JP2017/008519, filed on Mar. 3, 2017.

(30) Foreign Application Priority Data

Jul. 1, 2016   (JP) .................................. 2016-131362

(51) Int. Cl.
H04N 5/232   (2006.01)
G02B 7/28    (2006.01)
(Continued)

(52) U.S. Cl.
CPC .............. G02B 7/28 (2013.01); G02B 21/00 (2013.01); G06T 7/337 (2017.01); H04N 5/23212 (2013.01); H04N 5/23216 (2013.01)

(58) Field of Classification Search
CPC .. H04N 5/23212; H04N 5/23216; G02B 7/28; G06T 7/337
(Continued)

(56) References Cited

U.S. PATENT DOCUMENTS

| 4,810,869 A | 3/1989 | Yabe et al. |
| 2006/0000962 A1 | 1/2006 | Imabayashi et al. |

(Continued)

FOREIGN PATENT DOCUMENTS

| JP | 63-167313 A | 7/1988 |
| JP | 2004133156 A | 4/2004 |

(Continued)

OTHER PUBLICATIONS

Communication dated May 31, 2019, from European Patent Office in counterpart application No. 17819551.7.
(Continued)

*Primary Examiner* — Usman A Khan
(74) *Attorney, Agent, or Firm* — Sughrue Mion, PLLC

(57) ABSTRACT

Provided are an imaging device, an imaging method and an imaging control program which make it possible to shorten an imaging time, and to capture an image of each observation region at an appropriate focusing position regardless of the state of installation of a culture vessel on a stage. In a case where an observation target is imaged multiple times, a focusing position of an observation region within a culture vessel is detected by auto-focus control during first imaging, and the first imaging of each observation region is performed using the focusing position. Next, the focusing position of a reference position is detected by auto-focus control during second imaging subsequent to the first imaging, and the focusing position of each observation region detected in the first imaging is corrected on the basis of the detected focusing position and the focusing position of the reference position in the first imaging.

20 Claims, 8 Drawing Sheets

(51) Int. Cl.
*G02B 21/00* (2006.01)
*G06T 7/33* (2017.01)

(58) Field of Classification Search
USPC .......................................................... 348/345
See application file for complete search history.

(56) References Cited

U.S. PATENT DOCUMENTS

| | | |
|---|---|---|
| 2012/0194664 A1 | 8/2012 | Kiyota |
| 2013/0063584 A1 | 3/2013 | Nakasho |
| 2016/0232682 A1 | 8/2016 | Nakagawa et al. |
| 2017/0269346 A1 | 9/2017 | Sakamoto et al. |

FOREIGN PATENT DOCUMENTS

| | | | |
|---|---|---|---|
| JP | 2005-128493 A | | 5/2005 |
| JP | 2006-003653 A | | 1/2006 |
| JP | 2007-108223 A | | 4/2007 |
| JP | 2009-025349 A | | 2/2009 |
| JP | 2010-078940 A | | 4/2010 |
| JP | 2012-163767 A | | 8/2012 |
| JP | 2012-190028 A | | 10/2012 |
| JP | 2013-020172 A | | 1/2013 |
| JP | 2013061433 A | | 4/2013 |
| JP | 2016-009163 A | | 1/2016 |
| JP | 2016009163 A | * | 1/2016 |
| JP | 2016110038 A | | 6/2016 |
| WO | 2012/0194664 A1 | | 1/2011 |
| WO | 2015/041177 A1 | | 3/2015 |
| WO | 2016092820 A1 | | 6/2016 |

OTHER PUBLICATIONS

Communication dated Jul. 30, 2019, from the Japanese Patent Office in application No. 2016-131362.
Notification of Reason for Refusal dated Sep. 24, 2019 issued by the Korean Intellectual Property Office in counterpart application No. 10-2018-7036726.
International Search Report dated May 30, 2017, issued by the International Searching Authority in application No. PCT/JP2017/008519.
Written Opinion dated May 30, 2017, issued by the International Searching Authority in application No. PCT/JP2017/008519.
International Preliminary Report on Patentability with translation of Written Opinion dated Jan. 1, 2019, issued by the International Searching Authority in application No. PCT/JP2017/008519.
Communication dated Mar. 26, 2020, from Korean Intellectual Property Office in application No. KR10-2018-7036726.

* cited by examiner

IMAGE FOCUSING DEVICE, IMAGE FOCUSING METHOD AND COMPUTER READABLE MEDIUM WITH IMAGE FOCUSING CONTROL PROGRAM

CROSS-REFERENCE TO RELATED APPLICATIONS

This application is a Continuation of PCT International Application No. PCT/JP2017/008519 filed on Mar. 3, 2017, which claims priority under 35 U.S.C § 119(a) to Japanese Patent Application No. 2016-131362 filed on Jul. 1, 2016. Each of the above application(s) is hereby expressly incorporated by reference, in its entirety, into the present application.

BACKGROUND OF THE INVENTION

1. Field of the Invention

The present invention relates to an imaging device, an imaging method and a non-transitory computer readable recording medium storing an imaging control program for observing an image of the entire observation target by relatively moving a stage on which a culture vessel having an observation target received therein is installed and an imaging optical system that forms an image of an observation target.

2. Description of the Related Art

Hitherto, there is proposed a method of determining a differentiated state or the like of a cell by capturing an image of a multipotent stem cell such as an embryonic stem (ES) cell and an induced pluripotent stem (iPS) cell, a differentiation-induced cell, or the like using a microscope or the like, and capturing the feature of the image.

The multipotent stem cell such as an ES cell and an iPS cell has the capability of differentiating to cells of various tissues, and has attracted attention as can be applied to regenerative medical treatment, the development of drugs, the elucidation of diseases, and the like.

On the other hand, it is proposed to perform so-called tiling photography in which, in order to acquire a high-magnification wide-field image in a case where the image of a cell is captured using a microscope as described above, the range of a culture vessel such as, for example, a well plate is scanned in the observation region of an imaging optical system, images for each observation region are captured, and then the images for each observation region are bonded.

In a case where tiling photography is performed in this manner, each observation region is often imaged with a focus on the base of a culture vessel, but the bottom of the culture vessel does not necessarily have a uniform thickness within its surface, and has a variation for each observation region.

Therefore, it is preferable to perform auto-focus control for each observation region, but it takes approximately 200 ms to 3 s to perform auto-focus control on one observation region. Particularly, in a case where time-lapse imaging is performed, there is a problem in that an imaging time becomes longer in performing auto-focus control on all the observation regions whenever the imaging is performed.

Consequently, JP2013-020172A, JP2012-190028A, JP2009-025349A, JP2005-128493A, JP2007-108223A, JP2012-163767A, and JP1988-167313A (JPS63-167313A) propose that the focusing position of each observation region is acquired in advance, and the focusing position of each observation region is used in multiple imaging. It is proposed that, for example, in a case of time-lapse imaging, information of a focusing position obtained during first imaging is used in second and subsequent imaging.

SUMMARY OF THE INVENTION

However, for example, in a case where a culture vessel is temporarily removed from a stage in first imaging, and the culture vessel is reinstalled on the stage in second and subsequent imaging, the states of installation of the culture vessel on the stage are different from each other in the first imaging and the second and subsequent imaging. For this reason, the focusing position of each observation region acquired in the first imaging is not able to be used as it is.

Specifically, due to, for example, the distortion or the like of a culture vessel, the end of a culture vessel 100 is not grounded on a stage 150 in second and subsequent imaging as shown in FIG. 14, and the culture vessel 100 may be brought into a state (for example, θ is approximately 1°) of being partially apart from the stage 150 in some cases. In addition, since the movement of the culture vessel on the stage in a horizontal direction is regulated, a regulation member such as a plate holder may be provided on the stage. However, in a case where the culture vessel is inserted into this regulation member, the end of the culture vessel may be apart from the stage 150 because of insufficient insertion.

That is, in a case where the culture vessel is removed and reinstalled, there is a problem in that the state of installation changes during every imaging of even the same culture vessel, and that information of a focusing position acquired in advance is not able to be reused.

The present invention is contrived in view of the above problem, and an object thereof is to provide an imaging device, an imaging method and a non-transitory computer readable recording medium storing an imaging control program which make it possible to shorten an imaging time, and to capture an image of each observation region at an appropriate focusing position regardless of the state of installation of a culture vessel on a stage.

According to the present invention, there is provided an imaging device comprising: an imaging unit that scans observation regions within a culture vessel in which an observation target is received and which is installed on a stage, and performs imaging of each observation region within the culture vessel; and a controller that detects a focusing position of the observation region through auto-focus control, and controls the imaging unit to control imaging of the observation region on the basis of the detected focusing position, wherein, in a case where the observation target is imaged multiple times over time by the imaging unit, the controller detects the focusing position of the observation region within the culture vessel through the auto-focus control in a case where first imaging is performed by the imaging unit, and performs the first imaging of each observation region using the detected focusing position, and in a case where second imaging subsequent to the first imaging is performed by the imaging unit, the controller detects focusing positions of a plurality of reference positions which are set in advance within the culture vessel through the auto-focus control, corrects a focusing position of each observation region detected in the first imaging on the basis of the detected focusing positions and a focusing position of the reference position in the first imaging, and performs the second imaging using the corrected focusing position of each observation region.

In addition, the imaging device of the present invention further comprises, in a case where an observation target received in each of a plurality of the culture vessels is imaged multiple times over time, a reference focusing position storage unit that stores identification information of the culture vessel, a focusing position of an observation region detected in the first imaging of an observation target within a culture vessel identified by the identification information, and the focusing position of the reference position in the first imaging of the observation target in association with each other, and the controller may acquire identification information of the culture vessel which is a target of the second imaging in a case where the second imaging is performed, read out and acquire the focusing position of the observation region and the focusing position of the reference position stored in association with the acquired identification information from the reference focusing position storage unit, correct the focusing position of the observation region on the basis of the acquired focusing position of the reference position and the focusing position of the reference position detected by the auto-focus control, and perform the second imaging using the corrected focusing position of each observation region.

In addition, in the imaging device of the present invention, in a case where third imaging subsequent to the second imaging is performed, the controller may detect the focusing position of the reference position through the auto-focus control, correct a focusing position of each observation region acquired by correction in the second imaging on the basis of the detected focusing position and the focusing position of the reference position used in the second imaging, and perform the third imaging using the corrected focusing position of each observation region.

In addition, the imaging device of the present invention, it is preferable that the plurality of reference positions are set for each partial region within the culture vessel, and that the controller corrects the focusing position of each observation region for each partial region.

In addition, it is preferable that the imaging device of the present invention further comprises a reference position detection unit that detects the reference position, and that the controller acquires the reference position detected by the reference position detection unit.

In addition, in the imaging device of the present invention, the reference position detection unit may detect an end of the culture vessel or an index provided in the culture vessel, and detect the reference position on the basis of the detection result.

In addition, in the imaging device of the present invention, a hole portion formed in the culture vessel or a marker attached to the culture vessel may be used as the index.

In addition, in the imaging device of the present invention, the reference position detection unit may detect the reference position on the basis of an image obtained by imaging the culture vessel.

In addition, the imaging device of the present invention may further comprise a reference position acceptance unit that accepts a setting input of the reference position.

In addition, in the imaging device of the present invention, the imaging unit may comprise a phase difference microscope.

According to the present invention, there is provided an imaging method comprising: scanning an observation region within a culture vessel in which an observation target is received and which is installed on a stage; detecting a focusing position of the observation region through auto-focus control; and performing imaging of the observation region on the basis of the detected focusing position, wherein, in a case where the observation target is imaged multiple times over time, the method includes detecting the focusing position of the observation region within the culture vessel through the auto-focus control in a case where first imaging is performed, and performing the first imaging of each of the observation regions using the detected focusing position, and detecting focusing positions of a plurality of reference positions which are set in advance within the culture vessel through the auto-focus control in a case where second imaging subsequent to the first imaging is performed, correcting the focusing position of each observation region detected in the first imaging on the basis of the detected focusing position and a focusing position of the reference position in the first imaging, and performing the second imaging using the corrected focusing position of each observation region.

According to the present invention, there is provided an imaging control program causing a computer to execute a procedure of scanning an observation region within a culture vessel in which an observation target is received and which is installed on a stage, a procedure of detecting a focusing position of the observation region through auto-focus control, and a procedure of performing imaging of the observation region on the basis of the detected focusing position, wherein, in a case where the observation target is imaged multiple times over time, the program causes the computer to execute a procedure of detecting the focusing position of the observation region within the culture vessel through the auto-focus control in a case where first imaging is performed, and a procedure of performing the first imaging of each of the observation regions using the detected focusing position, and the program causes the computer to execute, a procedure of detecting focusing positions of a plurality of reference positions which are set in advance within the culture vessel through the auto-focus control in a case where second imaging subsequent to the first imaging is performed, a procedure of correcting the focusing position of each observation region detected in the first imaging on the basis of the detected focusing position and a focusing position of the reference position in the first imaging, and a procedure of performing the second imaging using the corrected focusing position of each observation region.

According to the imaging device, the imaging method and the imaging control program of the present invention, in a case where the observation target is imaged multiple times over time, the focusing position of an observation region within the culture vessel is detected by the auto-focus control in a case where first imaging is performed, and first imaging of each of the observation regions is performed using the detected focusing position. Next, focusing positions of a plurality of reference positions which are set in advance within the culture vessel are detected by the auto-focus control in a case where second imaging subsequent to the first imaging is performed, a focusing position of each observation region detected in the first imaging is corrected on the basis of the detected focusing position and a focusing position of the reference position in the first imaging, and second imaging is performed using the corrected focusing position of each observation region.

That is, in the second imaging, since auto-focus control of the observation region is not performed, an imaging time can be shortened. Since the focusing position of each observation region detected in the first imaging is further corrected on the basis of the focusing position of the reference position in the first imaging and the focusing position of the reference position detected in the second imaging, an image of each observation region can be captured at an appropriate focusing position regardless of the state of installation of the culture vessel on the stage.

DESCRIPTION OF THE PREFERRED EMBODIMENTS

Figure 1:
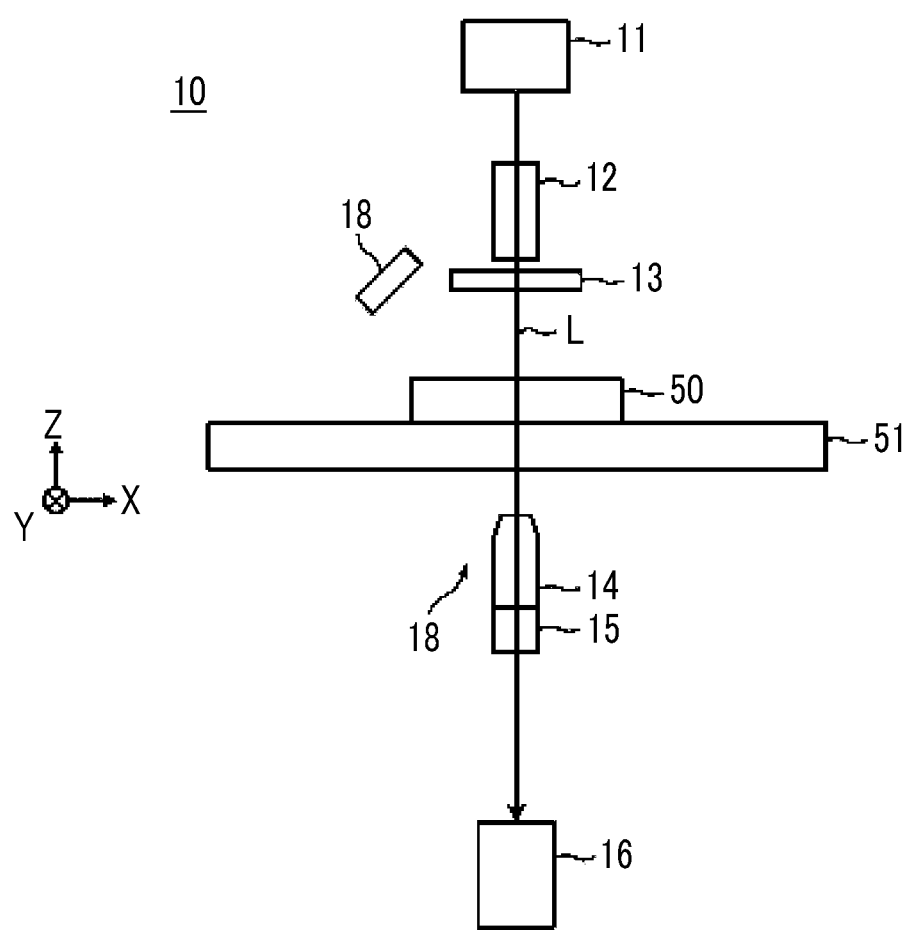
FIG. 1 is a diagram illustrating a schematic configuration of a microscope imaging system using an embodiment of an imaging device of the present invention.

Hereinafter, a microscope observation system using an embodiment of an imaging device, an imaging method and an imaging control program of the present invention will be described in detail with reference to the accompanying drawings. FIG. 1 is a block diagram illustrating a schematic configuration of a microscope device 10 in the microscope observation system of the present embodiment.

The microscope device 10 is configured to capture a phase difference image of a cultured cell which is an observation target. Specifically, as shown in FIG. 1, the microscope device 10 comprises a white light source 11 that emits white light, a capacitor lens 12, a slit plate 13, an imaging optical system 14, an imaging optical system driving unit 15, and an imaging element 16. Meanwhile, in the present embodiment, the microscope device 10 is equivalent to an imaging unit of the present invention.

The slit plate 13 is provided with a ring-shaped slit for transmitting white light with respect to a light shielding plate that shields white light emitted from the white light source 11, and ring-shaped illumination light L is formed by the white light passing through the slit.

Figure 2:
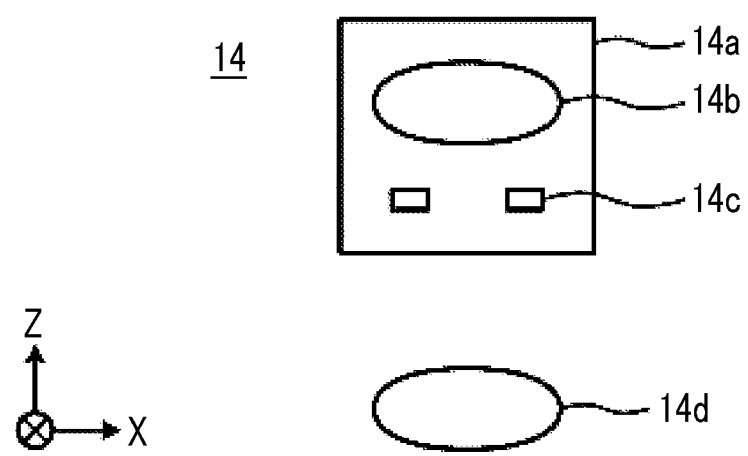
FIG. 2 is a schematic diagram illustrating a configuration of an imaging optical system.

FIG. 2 is a diagram illustrating a detailed configuration of the imaging optical system 14. As shown in FIG. 2, the imaging optical system 14 comprises a phase difference lens 14a and an imaging lens 14d. The phase difference lens 14a comprises an objective lens 14b and a phase plate 14c. The phase plate 14c is configured to form a phase ring on a plate transparent to the wavelength of the illumination light L. Meanwhile, the size of the slit of the above-described slit plate 13 has a relationship conjugate to the phase ring of the phase plate 14c.

The phase ring is configured such that a phase film having the phase of incident light shifted by ¼ wavelength and a dimming filter that dims the incident light are formed in a ring shape. Direct light which is incident on the phase ring has its phase shifted by ¼ wavelength by passing through the phase ring, and has its brightness weakened. On the other hand, most of diffracted light diffracted by an observation target passes through the transparent plate of the phase plate 14c, and the phase and brightness thereof do not change.

The imaging optical system 14 is moved in the optical axis direction of the objective lens 14b by the imaging optical system driving unit 15 shown in FIG. 1. Meanwhile, in the present embodiment, the optical axis direction of the objective lens 14b and a Z direction (vertical direction) are the same as each other. Auto-focus control is performed by the movement of the imaging optical system 14 in the Z direction, and the contrast of a phase difference image captured by the imaging element 16 is adjusted.

In addition, a configuration may be used in which the magnification of the phase difference lens 14a can be changed. Specifically, the phase difference lens 14a or the imaging optical system 14 having different magnifications may be configured to be replaceable. The replacement of the phase difference lens 14a or the imaging optical system 14 may be configured to be automatically performed, and may be configured to be manually performed by a user.

The imaging optical system driving unit 15 includes an actuator such as, for example, a piezoelectric element, and is driven on the basis of a control signal which is output from an imaging controller 21 described later. Meanwhile, the imaging optical system driving unit 15 is configured to transmit a phase difference image having passed through the phase difference lens 14a as it is. In addition, the configuration of the imaging optical system driving unit 15 has only to be capable of moving the imaging optical system 14 in the Z direction without being limited to a piezoelectric element, and other known configurations can be used.

The imaging lens 14d is configured such that a phase difference image having passed through the phase difference lens 14a is incident thereon, and the image is formed on the imaging element 16.

The imaging element 16 captures the phase difference image formed by the imaging lens 14d. As the imaging element 16, an imaging element such as a charge-coupled device (CCD) image sensor, a complementary metal-oxide semiconductor (CMOS) image sensor, or the like is used. As the imaging element, an imaging element provided with a color filter of red green blue (RGB) may be used, and an imaging element of monochrome may be used.

A stage 51 is provided between the slit plate 13 and the phase difference lens 14a. A culture vessel 50 having a cell which is an observation target received therein is installed on the stage 51.

As the culture vessel 50, a petri dish, a dish, a well plate, or the like can be used. In addition, examples of cells received in the culture vessel 50 include multipotent stem cells such as an iPS cell and an ES cell, cells of a nerve, a skin, a heart muscle and a liver differentiated and induced from a stem cell, cells of a skin, a retina, a heart muscle, a blood corpuscle, a nerve and an internal organ extracted from a human body, and the like.

The stage 51 is moved in an X direction and a Y direction orthogonal to each other by a horizontal direction driving unit 17 (see FIG. 6) described later. The X direction and the Y direction are directions orthogonal to a Z direction, and directions orthogonal to each other within a horizontal plane. In the present embodiment, the X direction is set to a main scanning direction, and the Y direction is set to a sub-scanning direction.

Figure 3:
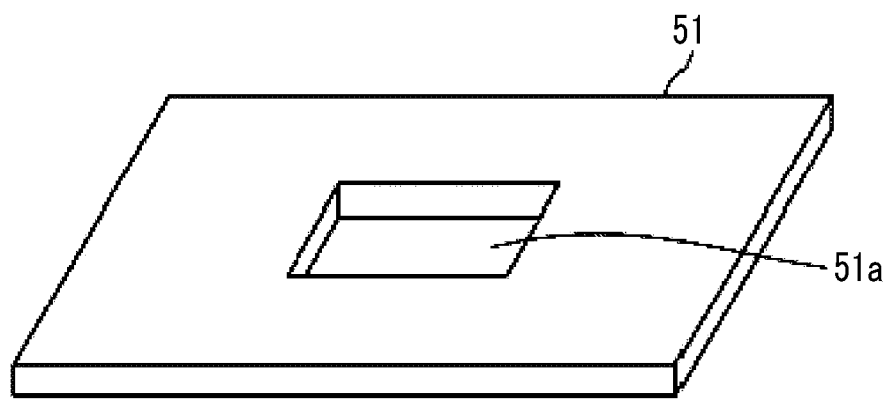
FIG. 3 is a perspective view illustrating a configuration of a stage.

FIG. 3 is a diagram illustrating an example of the stage 51. A rectangular opening 51a is formed at the center of the stage 51. The culture vessel 50 is installed on a member in which this opening 51a is formed, and is configured such that a phase difference image of a cell within the culture vessel 50 passes through the opening 51a.

In addition, as shown in FIG. 1, the microscope device 10 comprises a reference position detection unit 18. The reference position detection unit 18 is provided in the vicinity of the slit plate 13, and detects a reference position which is set in the culture vessel 50. The reference position detection unit 18 is constituted by, for example, a macro camera or the like, acquires an image by imaging the culture vessel 50 from obliquely upward, and detects a reference position on the basis of the image.

Meanwhile, in the present embodiment, the culture vessel 50 is imaged from obliquely upward as described above. However, without being limited thereto, the culture vessel 50 may be imaged from directly upward, for example, with the imaging surface of the reference position detection unit 18 directly downward. In the case, during imaging of the culture vessel 50, the culture vessel 50 may be disposed directly below the reference position detection unit 18 by moving the stage 51.

In addition, in a case where the culture vessel 50 itself or an index, described later, provided in the culture vessel 50 can be imaged from the downward direction of the stage 51, the reference position detection unit 18 may be disposed below the stage 51.

Figure 4:
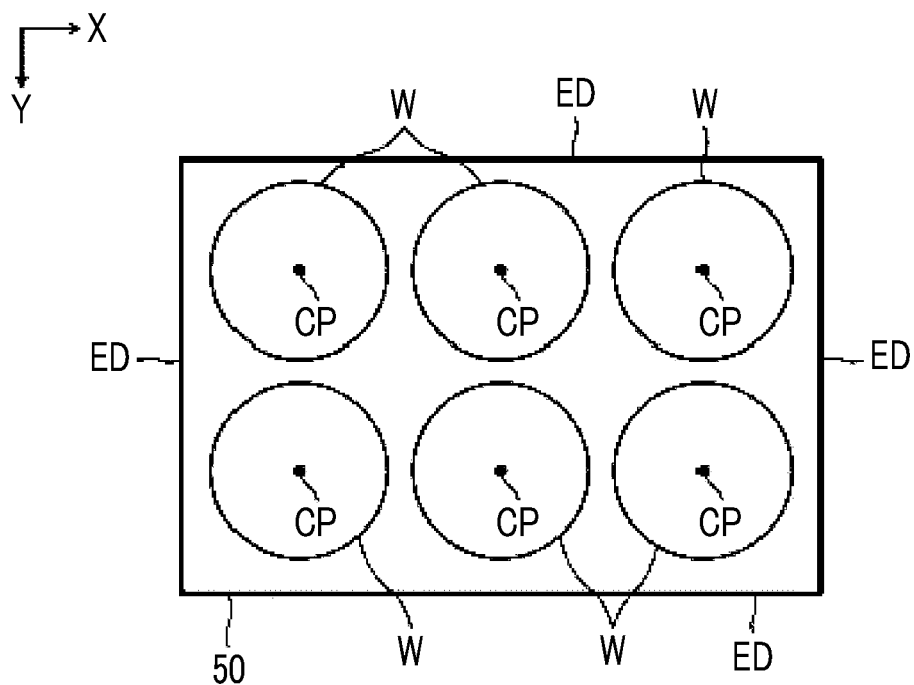
FIG. 4 is a diagram illustrating an example of reference positions which are set in a culture vessel.

Specifically, in the present embodiment, a well plate having six wells W as shown in FIG. 4 is used as the culture vessel 50, and the central position of each of the wells W is set in advance as a reference position CP.

The reference position detection unit 18 performs image processing such as edge detection on, for example, an image obtained by imaging the culture vessel 50 to detect an end ED of the culture vessel 50, and detects the reference position CP on the basis of the position of this end ED. Specifically, a positional relationship between the end ED of the culture vessel 50 and each reference position CP is set in advance, and each reference position CP is detected on the basis of the positional relationship and the end ED detected from the image.

Figure 5:
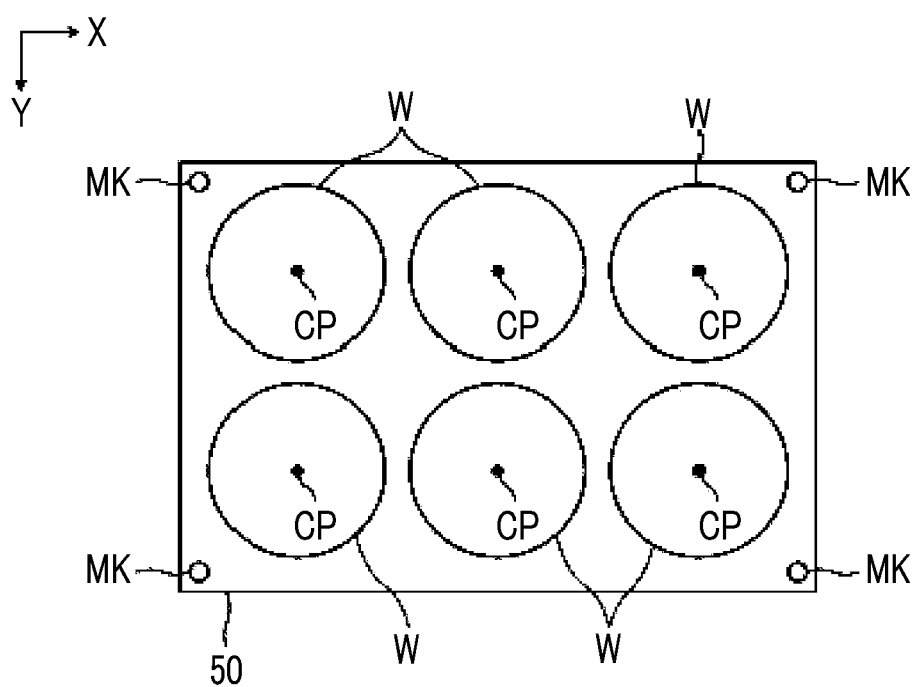
FIG. 5 is a diagram illustrating an example of indexes which are provided in the culture vessel.

Meanwhile, in the present embodiment, the end ED of the culture vessel 50 is detected from an image obtained by imaging the culture vessel 50. However, without being limited thereto, for example, the shape of each well W within the culture vessel 50 may be detected. In addition, as shown in FIG. 5, a configuration may be used in which four corners of the culture vessel 50 are provided with each hole portion MK as an index, the hole portion MK is detected from an image by image processing, and the reference position CP is detected on the basis of the position of the hole portion MK. An index provided in the culture vessel 50 is not limited to a hole portion, and may be a colored marker, a thing such as a protrusion, and be anything as long as it can be detected from an image.

Figure 6:
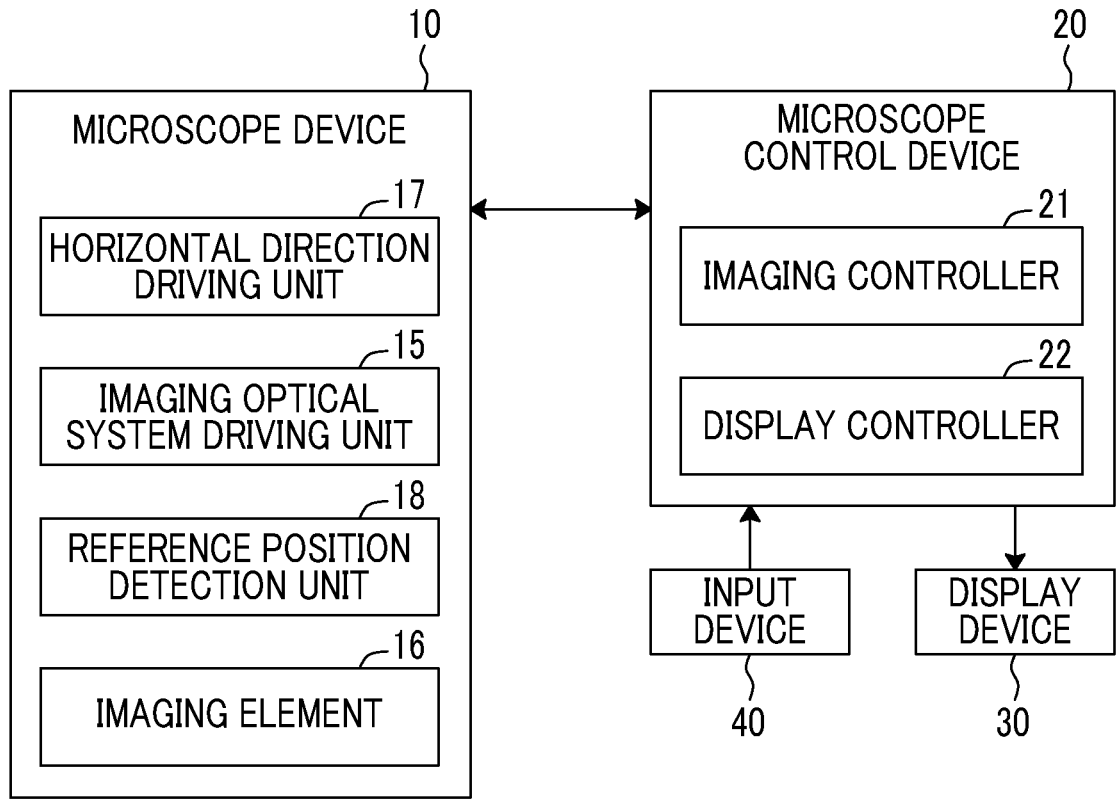
FIG. 6 is a block diagram illustrating a schematic configuration of the microscope imaging system using an embodiment of the imaging device of the present invention.

Next, the configuration of the microscope control device 20 that controls the microscope device 10 will be described. FIG. 6 is a block diagram illustrating a configuration of the microscope observation system of the present embodiment. Meanwhile, regarding the microscope device 10, a block diagram of some configurations controlled by each unit of the microscope control device 20 is shown.

The microscope control device 20 is configured to control the entirety of the microscope device 10, and to particularly comprise an imaging controller 21 and a display controller 22. Meanwhile, in the present embodiment, the imaging controller 21 is equivalent to a controller of the present invention.

The microscope control device 20 is constituted by a computer including a central processing unit, a semiconductor memory, a hard disk, and the like, and is configured such that an embodiment of an imaging control program of the present invention is installed on a hard disk. This imaging control program is executed by the central processing unit, and thus the imaging controller 21 and the display controller 22 shown in FIG. 6 perform their functions.

The imaging controller 21 controls the imaging optical system driving unit 15, the imaging element 16 and the horizontal direction driving unit 17, to thereby control imaging of an observation target which is performed by the microscope device 10.

Specifically, the imaging controller 21 moves the imaging optical system 14 in the Z direction (optical axis direction) by driving the imaging optical system driving unit 15 and performs auto-focus control. In the present embodiment, a phase difference image at each position is captured by the imaging element 16 while moving the imaging optical system 14 in the Z direction, and auto-focus control is performed by detecting a position at which the contrast of the phase difference image becomes highest as a focusing position.

In addition, the imaging controller 21 drives and controls the horizontal direction driving unit 17, to thereby move the stage 51 in the X direction and the Y direction. The horizontal direction driving unit 17 is constituted by an actuator having a piezoelectric element or the like.

Figure 7:
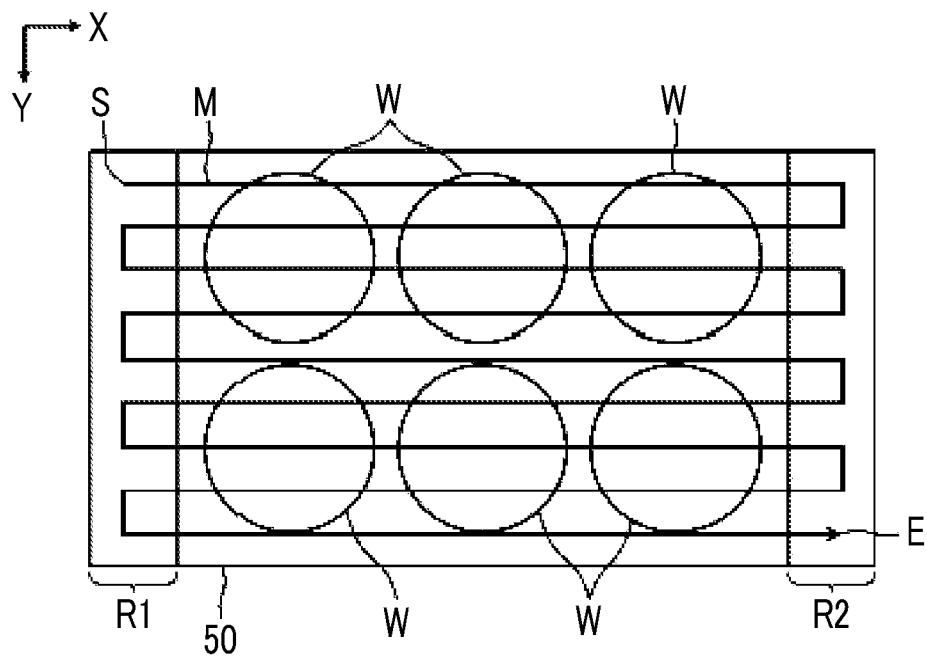
FIG. 7 is a diagram illustrating a scanning position of an observation region within the culture vessel.

In the present embodiment, the stage 51 is moved in the X direction and the Y direction by control performed by the imaging controller 21, and the observation region of the imaging optical system 14 is scanned in a two-dimensional shape within the culture vessel 50, to thereby capture a phase difference image of each observation region. FIG. 7 is a diagram illustrating a scanning position of an observation region within the culture vessel 50 using a solid line M. Meanwhile, in the present embodiment, a well plate having six wells W is used as the culture vessel 50.

As shown in FIG. 7, the observation region of the imaging optical system 14 moves along the solid line M from a scanning start point S to a scanning end point E. That is, the observation region is scanned in a forward direction (rightward direction in FIG. 5) which is the X direction, and then moves in the Y direction (downward direction in FIG. 5), followed by being scanned in a negative direction (leftward direction in FIG. 5) which is the X direction. Next, the observation region moves in the Y direction again, and is scanned in the forward direction which is the X direction again. In this manner, the observation region is scanned in a two-dimensional shape within the culture vessel 50 by repeatedly performing forward and backward movement in the X direction and movement in the Y direction.

Meanwhile, as described above, in a case where the observation region is scanned within the range of the culture vessel 50 by moving the stage 51 in the X direction, it is preferable that the movement speed of the observation region in the range of the culture vessel 50 is constant. Therefore, the stage 51 is required to be accelerated until reaching a constant speed at the time of the start of the movement of the stage 51 in the X direction, and the stage 51 is required to be decelerated from a constant speed and be stopped at the time of the end of the movement of the stage 51 in the X direction.

In addition, in a case where the movement speed of the stage 51 in the X direction is set to a constant speed, the movement speed can be rapidly controlled to a constant speed in a state where an acceleration region is almost not present. However, in a case where such control is performed, the solution level of a culture solution or the like received in the culture vessel 50 together with a cell is shaken, and thus there is the possibility of a deterioration in the image quality of a phase difference image being caused. In addition, there is the possibility of the same problem occurring even in a case where the stage 51 is stopped.

Consequently, in the present embodiment, a range R1 and a range R2 shown in FIG. 7 are set to acceleration-deceleration regions of the movement of the stage 51 in the X direction. In this manner, acceleration-deceleration regions are set in both side of the range of the culture vessel 50 in the X direction, and thus it is possible to scan an observation region at a constant speed in the range of the culture vessel 50, and to suppress a shake of the solution level of a culture solution.

In addition, in the present embodiment, the observation region of the imaging optical system 14 is scanned in the X direction and the Y direction, each observation region is imaged, and a phase difference image is acquired. However, in this case, as described above, the bottom of the culture vessel 50 does not necessarily have a uniform thickness within its surface, and has a variation for each observation region.

Therefore, it is preferable to perform auto-focus control for each observation region. However, in a case where time-lapse imaging of observation targets within the culture vessel 50 is performed, there is a problem in that an imaging time becomes longer in performing auto-focus control on all the observation regions whenever the imaging is performed.

Consequently, it is also considered that the focusing position of each observation region acquired by performing auto-focus control in first imaging is used in second and subsequent imaging, but there is a problem of a difference in the state of installation of the culture vessel 50 due to distortion or the like of the culture vessel 50. That is, in a case where the culture vessel 50 is temporarily removed from the stage 51 in the first imaging, and the culture vessel 50 is reinstalled on the stage 51 in the second and subsequent imaging, the states of installation of the culture vessel 50 on the stage 51 are different from each other in the first imaging and the second and subsequent imaging. For this reason, the focusing position of each observation region acquired in the first imaging may not be able to be used as it is in some cases.

Figure 8:
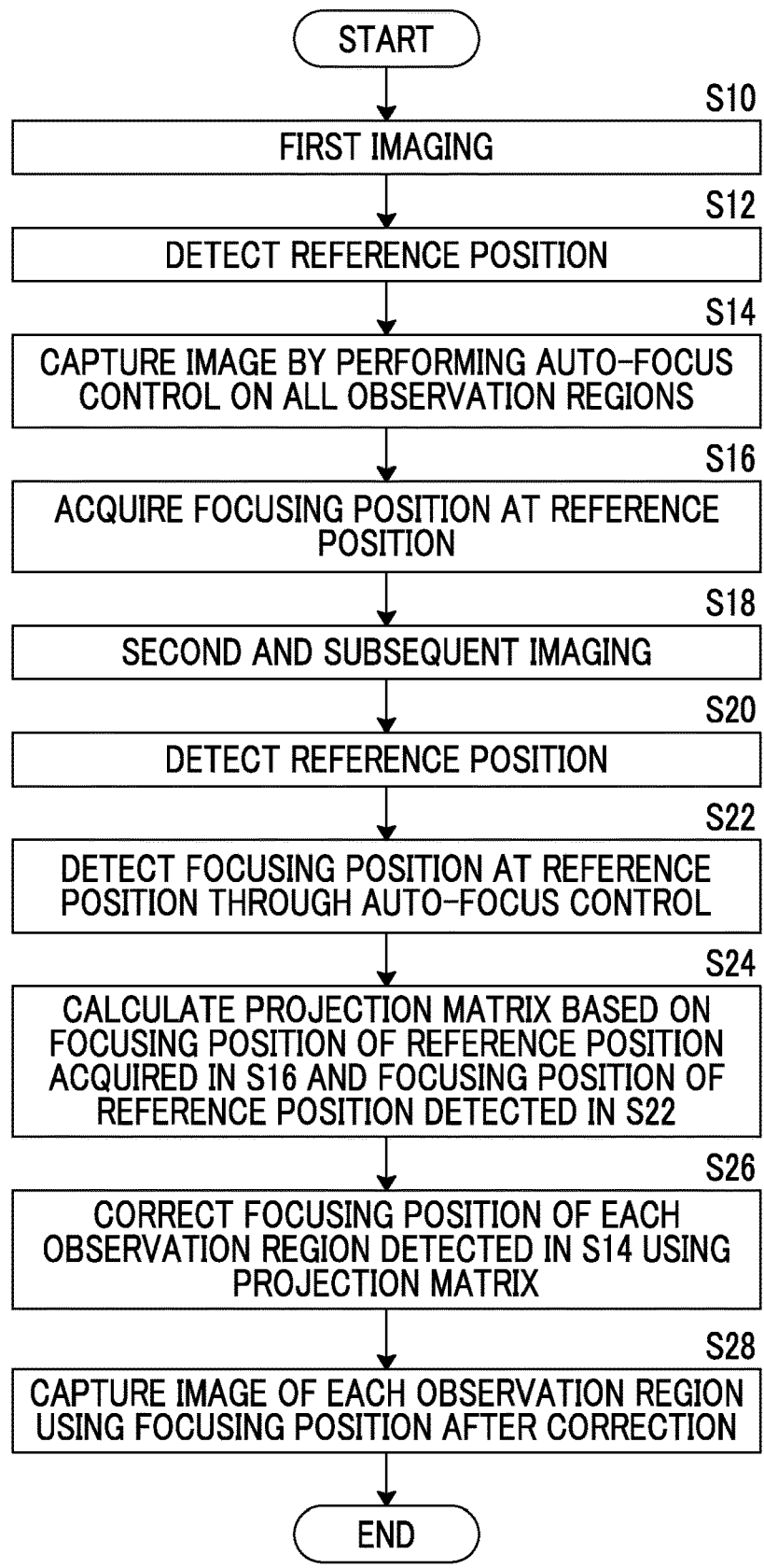
FIG. 8 is a flowchart illustrating an action of the microscope imaging system using an embodiment of the imaging device of the present invention.

Hereinafter, reference will be made to a flowchart shown in FIG. 8 to describe a method in which an imaging time can be shortened, and a phase difference image of each observation region is captured at an appropriate focusing position regardless of the state of installation of the culture vessel 50 on the stage 51.

First, in a case where one-time imaging (first imaging) is performed (S10), the culture vessel 50 is installed on the stage 51, and a reference position which is set within the culture vessel 50 is detected by the reference position detection unit 18 (S12). Specifically, as described above, each central position of six wells W is detected as the reference position CP, and its position information is stored in a storage medium such as a memory.

Next, the imaging controller 21 detects the focusing positions of all the observation regions within the culture vessel 50 through auto-focus control, and controls the imaging optical system driving unit 15 using the detected focusing positions to capture a phase difference image of each observation region (S14). Meanwhile, in this case, the focusing position of each observation region is stored in a storage medium such as a memory.

Next, the focusing position of the reference position detected in S12 is acquired (S16). The acquisition of the focusing position of the reference position, for example, the acquisition may be performed by detecting a focusing position by performing auto-focus control at the reference position CP, or a focusing position detected in a case where a phase difference image of each observation region is captured in S14 may be used. In a case where a focusing position detected in S14 is used, the focusing position of an observation region closest to each reference position CP may be acquired. In addition, in a case where a focusing position is acquired by performing auto-focus control at the reference position CP, the control may be performed until the acquisition of a focusing position during the detection of a reference position in S12. The focusing position of the reference position acquired in S16 is stored in a storage medium such as a memory, and the culture vessel 50 is removed from on the stage 51.

Next, in a case where two-time imaging and subsequent imaging (second imaging) is performed (S18), first, the culture vessel 50 is reinstalled on the stage 51, and similarly to the first imaging, a reference position which is set within the culture vessel 50 is detected by the reference position detection unit 18 (S20).

The imaging controller 21 detects the focusing position of the reference position CP within the culture vessel 50 through auto-focus control (S22).

Next, the focusing position of the reference position CP in the first imaging acquired in S16 is read out, and a projection matrix is calculated on the basis of the focusing position of this reference position CP and the focusing position of the reference position CP in the second and subsequent imaging detected in S22 (S24).

Figure 9:
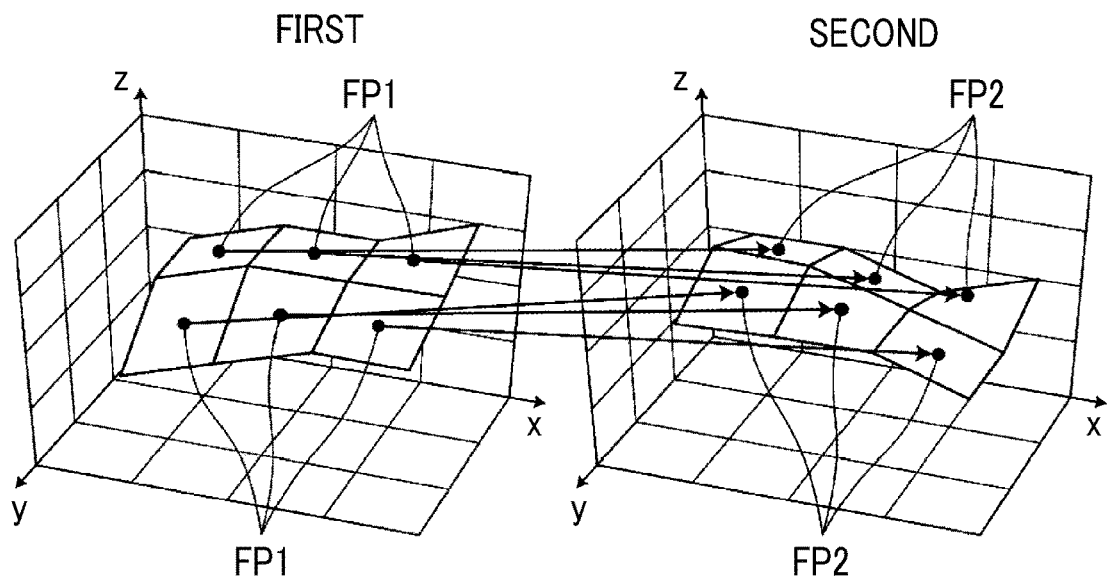
FIG. 9 is a diagram illustrating an example of a three-dimensional positional relationship between a focusing position FP1 of a reference position in first imaging and a focusing position FP2 of a reference position in second imaging.

FIG. 9 shows an example of a three-dimensional positional relationship between a focusing position FP1 of the reference position CP in the first imaging and a focusing position FP2 of the reference position CP in the second imaging. As shown using arrows in FIG. 9, the imaging controller 21 associates each focusing position FP1 in the first imaging with each focusing position FP2 in the second imaging, and obtains a projection matrix from a correspondence relation therebetween. Meanwhile, it is preferable to acquire the focusing positions of at least four reference positions in order to obtain the projection matrix. In the present embodiment, since the focusing position of each reference position of six wells W is acquired, the projection matrix is calculated from a correspondence relation between the focusing positions of six reference positions. However, six focusing positions may not necessarily be used. Four focusing positions adjacent to each other among the six focusing positions are specified, and the projection matrix is calculated from the four focusing positions, whereby the projection matrix may be calculated for each partial region within the culture vessel 50. Further, for example, as shown in FIG. 10, the projection matrix may be calculated for each well W by setting reference positions CP1 to CP12 so that four reference positions are set with respect to each well W.

Figure 10:
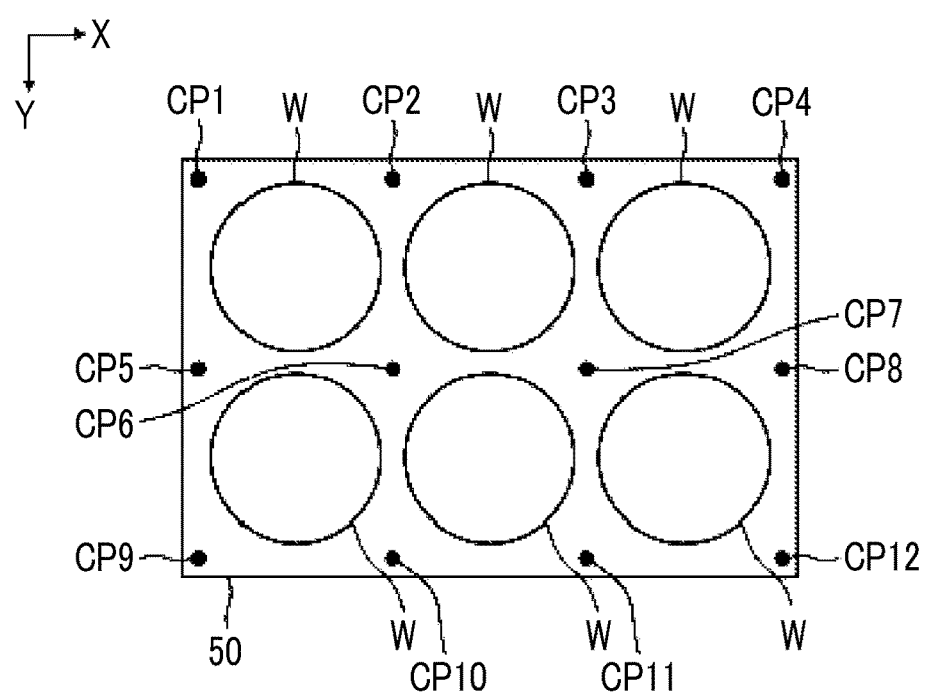
FIG. 10 is a diagram illustrating another example of reference positions which are set in the culture vessel.

Specifically, for example, the projection matrix for each well W may be calculated by acquiring the focusing positions of the reference positions CP1, CP2, CP5, and CP6 in the first imaging and the second and subsequent imaging, calculating the projection matrix of an upper leftmost well W shown in FIG. 10 on the basis of a correspondence relation between the focusing position in the first imaging and the focusing position in the second and subsequent imaging, further acquiring the focusing positions of the reference positions CP5, CP6, CP9, and CP10 in the first imaging and the second and subsequent imaging, and calculating the projection matrix of a lower leftmost well W shown in FIG. 10 on the basis of a correspondence relation between the focusing position in the first imaging and the focusing position in the second and subsequent imaging.

Next, the imaging controller 21 reads out the focusing position of each observation region in the first imaging acquired in S14, and corrects the focusing position of each observation region using the projection matrix calculated as described above (S26).

Specifically, in a case where the focusing position of each observation region in the first imaging is set to P1 (x1, y1, z1), the projection matrix is set to H, and a focusing position after correction is set to P2 (x1, y1, z1), the focusing position P2 after correction is calculated by calculating P2=H×P1. Meanwhile, in a case where a projection matrix is calculated not in the entirety of the culture vessel 50, but for each partial region within the culture vessel 50, the focusing position of each observation region may be corrected using a projection matrix calculated with respect to a region to which each observation region belongs.

The imaging controller 21 controls the imaging optical system driving unit 15 using the focusing position P2 after correction of each observation region to capture a phase difference image of each observation region (S28). After the capture of the phase difference image is terminated, the culture vessel 50 is removed from the stage 51.

Meanwhile, in S24, the focusing position FP1 of each reference position in the first imaging and the focusing position FP2 of each reference position in the second imaging are associated with each other, and the projection matrix is obtained from a correspondence relation therebetween. However, for example, in a case where a reference position is detected by image processing, the reference position is not able to be detected definitely, and thus a case is considered in which the focusing position FP1 of each reference position and the focusing position FP2 of each reference position in the second imaging are not associated with each other. Consequently, in such a case, a correspondence relation between the focusing positions of each reference position may be obtained by estimating the outlier of a reference position using, for example, a random sample consensus (RANSAC).

Referring back to FIG. 6, the display controller 22 generates one synthetic phase difference image by bonding the phase difference images of the respective observation regions captured by the microscope device 10, and causes a display device 30 to display the synthetic phase difference image.

The display device 30 displays the synthetic phase difference image generated by the display controller 22, and includes, for example, a liquid crystal display or the like. In addition, the display device 30 may be constituted by a touch panel, and may serve as an input device 40.

The input device 40 includes a mouse, a keyboard or the like, and accepts a user's various setting inputs. The input device 40 of the present embodiment accepts a setting input such as, for example, an instruction for change of the magnification of the phase difference lens 14*a*.

According to the microscope imaging system of the embodiment, in a case where time-lapse imaging is performed, and the first imaging is performed, the focusing positions of all the observation regions within the culture vessel 50 are detected through auto-focus control, the first imaging of each observation region is performed using the detected focusing positions, and the focusing positions of a plurality of reference positions which are set within the culture vessel 50 are acquired. In a case where the second imaging subsequent to the first imaging is performed, the focusing position of the reference position is detected through auto-focus control, the focusing position of each observation region detected in the first imaging is corrected on the basis of the detected focusing position and the focusing position of the reference position acquired in the first imaging, and the second imaging is performed using the corrected focusing position of each observation region.

That is, in the second imaging, since auto-focus control of all the observation regions is not performed, an imaging time can be shortened. Since the focusing position of each observation region detected in the first imaging is further corrected on the basis of the focusing position of the reference position in the first imaging and the focusing position of the reference position detected in the second imaging, an image of each observation region can be captured at an appropriate focusing position regardless of the state of installation of the culture vessel 50 on the stage 51.

Meanwhile, in the embodiment, one-time imaging is set to first imaging, and two-time imaging is set to second imaging, the first imaging and the second imaging are not necessarily limited to one-time imaging and two-time imaging. For example, two-time imaging may be set to the first imaging, and four-time imaging may be set to the second imaging.

In addition, in the embodiment, the focusing position of each observation region detected in the first imaging is corrected, and the second imaging is performed using the corrected focusing position of each observation region. However, in a case where third imaging after the second imaging is further performed, the focusing position of the reference position is detected again through auto-focus control, the focusing position of each observation region acquired by correction in the second imaging is further corrected on the basis of the detected focusing position and the focusing position of the reference position used in the second imaging, and thus the third imaging may be performed using the corrected focusing position of each observation region. In addition, the focusing position of the reference position used in the third imaging may be corrected and acquired on the basis of the focusing position of the reference position used in the first imaging.

In addition, in the embodiment, the focusing positions of all the observation regions within the culture vessel 50 are detected in the first imaging, but observation regions in which focusing positions are not detected may be present. In such a case, for example, a focusing position detected in an observation region in the vicinity of an observation region in which a focusing position is not detected may be used as the focusing position of an observation region in which a focusing position is not detected.

In addition, in the embodiment, after the culture vessel 50 is installed on the stage 51 in the first imaging, the detection of a reference position which is set within the culture vessel 50, the detection of the focusing position of an observation region through auto-focus control, the capture of a phase difference image of each observation region using the detected focusing position, and the acquisition of the focusing position of the reference position are performed, and a series of operations of removing the culture vessel 50 from above the stage 51 is performed, but there is no limitation to such a flow of processes. For example, after the detection of a reference position which is set within the culture vessel 50, the detection of the focusing position of an observation region through auto-focus control, and the acquisition of the focusing position of the reference position are performed, the culture vessel 50 is removed from above the stage 51 one time, and then after the culture vessel 50 is reinstalled on the stage 51, a phase difference image of each observation region may be captured using a focusing position which has already been acquired.

That is, an operation for removing the culture vessel 50 from the stage 51 may be performed between an operation for detecting the focusing position of each observation region and an operation for capturing a phase difference image of each observation region. In this case, the acquisition of the detected focusing position of the reference position may be performed before or after the culture vessel 50 is removed from above the stage 51.

In addition, in the embodiment, a case in which time-lapse imaging is performed on an observation target received in one culture vessel 50 has been described. However, without being limited thereto, for example, a single cell line may be divided into two or more culture vessels 50 and be cultured, and time-lapse imaging may be performed on cells within each culture vessel 50 while replacing the culture vessel 50. In such a case, since the variation states of the thicknesses of bottoms are different from each other between the culture vessels 50, it is preferable that the focusing position of the reference position in the first imaging and the focusing position of each observation region are managed for each culture vessel 50.

Figure 11:
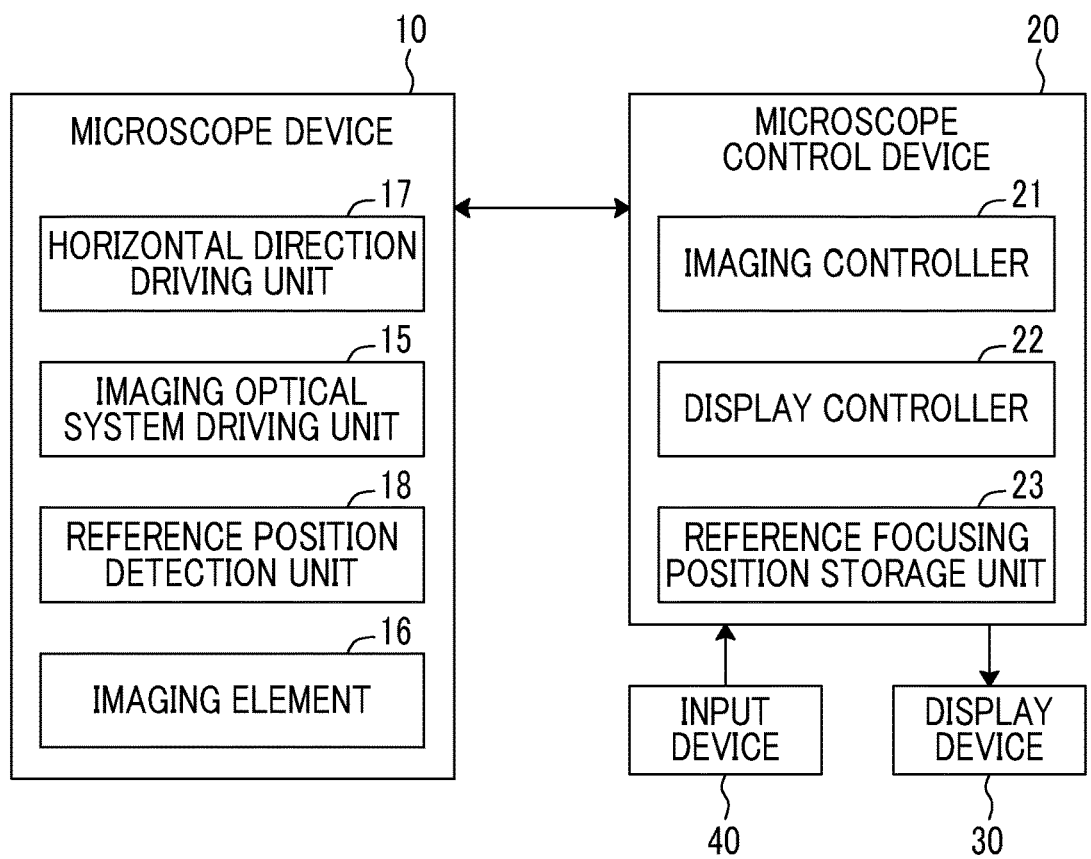
FIG. 11 is a block diagram illustrating a schematic configuration of a microscope imaging system using another embodiment of the imaging device of the present invention.

Consequently, the microscope control device 20 of the microscope observation system of the embodiment may be further provided with a reference focusing position storage unit 23 as shown in FIG. 11.

The reference focusing position storage unit 23 stores identification information of the culture vessel 50, the focusing positions of all the observation regions detected in the first imaging of an observation target within the culture vessel 50 identified by the identification information, and the focusing position of the reference position acquired in the first imaging in association with each other.

In a case where the second imaging is performed, the imaging controller 21 acquires identification information of the culture vessel 50 which is a target of the second imaging. The imaging controller 21 reads out and acquires the focusing positions of all the observation regions and the focusing position of the reference position stored in association with the acquired identification information from the reference focusing position storage unit 23. Next, the imaging controller 21 corrects the focusing positions of all the observation regions on the basis of the focusing position of the reference position read out and acquired from the reference focusing position storage unit 23 and the focusing position of the reference position detected by auto-focus control, and performs the second imaging using the corrected focusing position of each observation region.

Identification information is given for each culture vessel 50 as described above, and the correction of the focusing position of each observation region in the second and subsequent imaging is performed on the individual culture vessel 50 on the basis of information of the focusing position in the first imaging of the individual culture vessel 50 stored in the reference focusing position storage unit 23, thereby allowing control of a more appropriate focusing position to be performed.

Meanwhile, the identification information of the culture vessel 50 may be set and input, for example, by a user using the input device 40. The culture vessel 50 may be provided with a storage medium that stores a bar code or identification information of a radio frequency integrated circuit (RFIC) or the like, and the identification information which is read out from the storage medium may be acquired by the imaging controller 21.

In addition, in the embodiment, the reference position detection unit 18 is configured to capture an image of the culture vessel 50, and to detect a reference position on the basis of the image, but may not necessarily be provided with the reference position detection unit 18. For example, an image obtained by capturing the culture vessel 50 from upward may be displayed on the display device 30, and a user may designate a reference position on the displayed image. The reference position is set and input using, for example, the input device 40. The input device 40 is equivalent to a reference position acceptance unit of the present invention.

In addition, in the embodiment, on the assumption that reference positions within the culture vessel 50 are shifted within an X-Y plane in the first imaging and the second and subsequent imaging, the reference positions are detected for every imaging. However, for example, in a case where a regulation member that regulates the movement of the culture vessel 50 in an X-Y direction is provided on the stage 51, a case does not occur in which the reference positions are shifted in the first imaging and the second imaging. Therefore, in such a case, the reference positions may be stored in a storage medium such as a memory in advance without requiring providing the reference position detection unit 18. In the first imaging and the second and subsequent imaging, the reference position stored in a storage medium in advance may be read out, and the focusing positions of the reference positions may be acquired.

In addition, in the embodiment, since the focusing position of each observation region is estimated in the second and subsequent imaging on the basis of the focusing positions of the reference positions, there is also the possibility of blurriness being generated in a phase difference image due a deficiency in the correction of the focusing positions. In such a case, the number of reference positions may be increased. Specifically, a new reference position may be set by, for example, performing an interpolation arithmetic operation on the reference position detected by the reference position detection unit 18 or the reference position designated by a user. Alternatively, a user may be caused to set and input a new reference position using the input device 40.

In addition, in the embodiment, since four reference positions are set, and a projection matrix is obtained from a correspondence relation between the focusing position of each reference position in the first imaging and each reference position in the second imaging, the focusing position of each observation region in the first imaging is corrected using the projection matrix, but the number of reference positions may not necessarily be four, and may be two or three.

Figure 12:
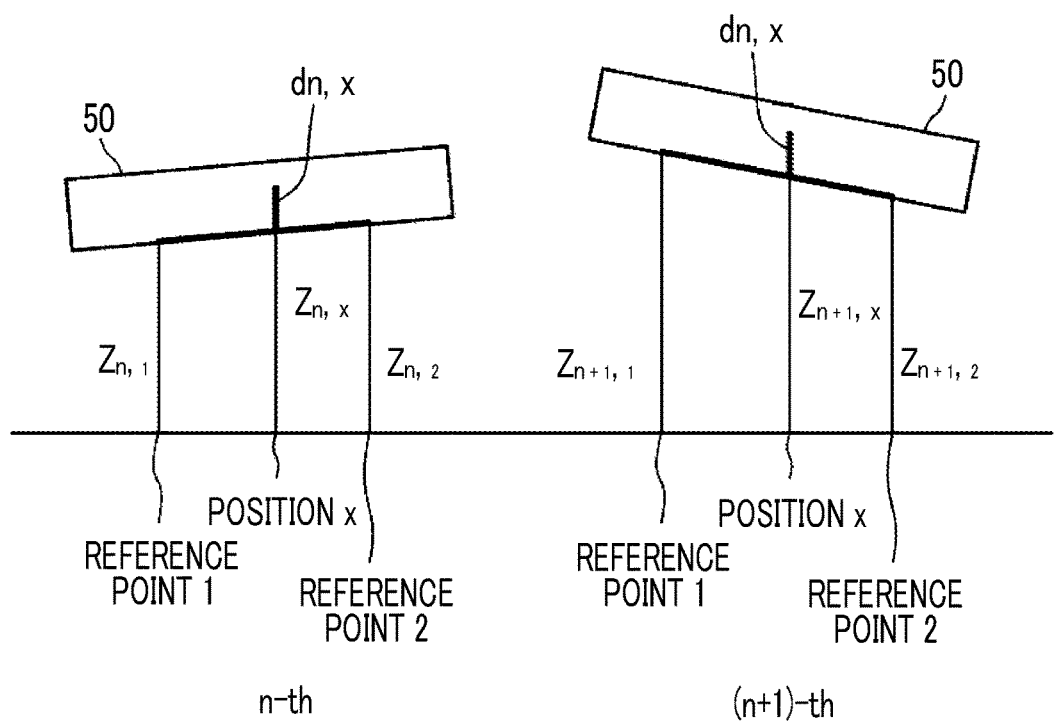
FIG. 12 is a diagram illustrating a method of correcting a focusing position of each observation region in a case where two reference points are set.

FIG. 12 is a diagram illustrating a method of correcting a focusing position of each observation region in a case where two reference points 1 and 2 are set. Specifically, in a case where the focusing position of the reference point 1 detected in n-th (for example, first) imaging is Zn, 1, and the focusing position of the reference point 2 is Zn, 2, a line segment that links these two focusing positions is obtained. The amount of Z displacement dn, x from the line segment is obtained with respect to the focusing position of each observation region (position x) acquired in the n-th imaging. Next, in a case where, during (n+1)-th (for example, second) imaging, the focusing position of the reference point 1 is Zn+1, 1, and the focusing position of the reference point 2 is Zn+1, 2, a line segment that links these two focusing positions is obtained similarly to the n-th imaging. A focusing position in each observation region (position x) is linearly estimated from the line segment, and a focusing position Zn+1, x after correction is acquired by adding the amount of Z displacement dn, x to this estimated value.

Figure 13:
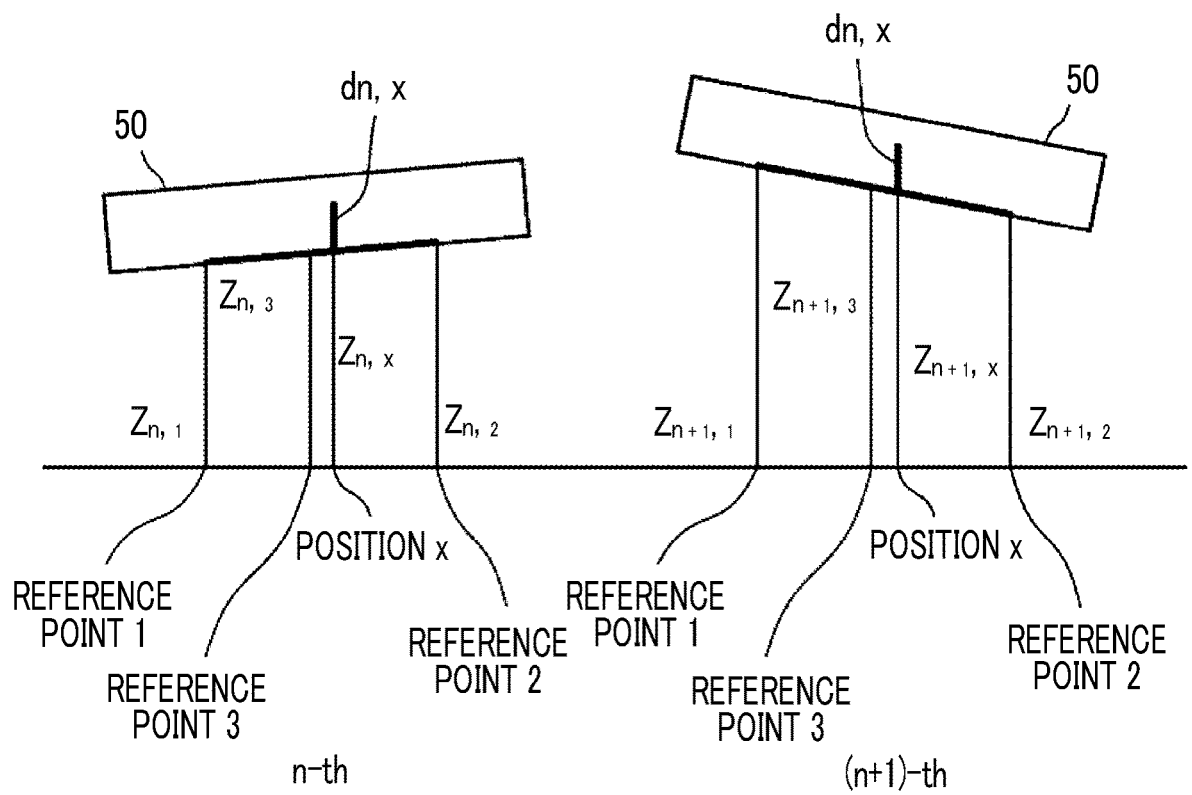
FIG. 13 is a diagram illustrating a method of correcting a focusing position of each observation region in a case where three reference points are set.
Figure 14:
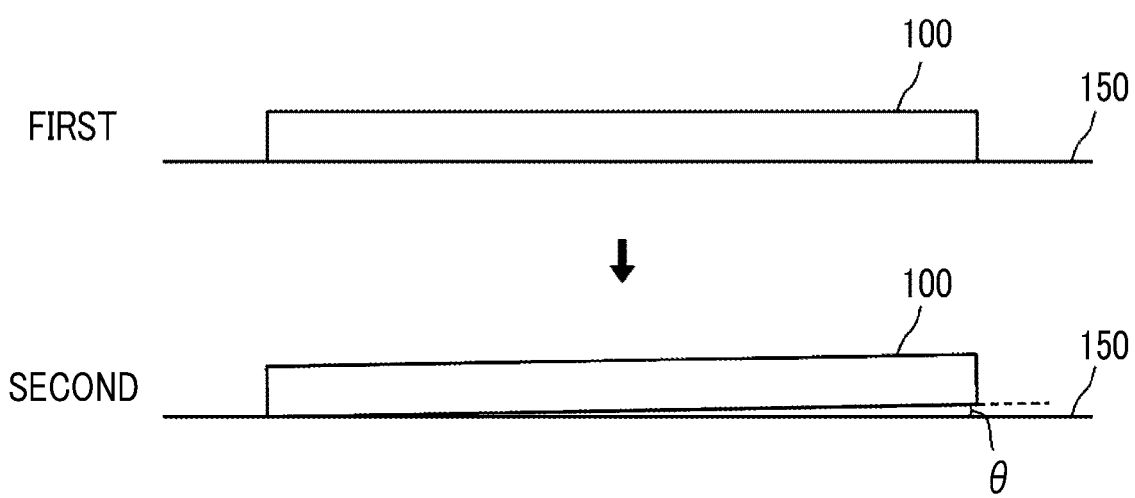
FIG. 14 is a diagram illustrating a difference in the state of installation of the culture vessel.

FIG. 13 is a diagram illustrating a method of correcting a focusing position of each observation region in a case where three reference points 1, 2 and 3 are set. Specifically, in a case where the focusing position of a reference point 1 detected in the n-th (for example, first) imaging is Zn, 1, the focusing position of the reference point 2 is Zn, 2, and the focusing position of the reference point 3 is Zn, 3, a plane passing through these three focusing positions is obtained. The amount of Z displacement dn, x from the plane is obtained with respect to the focusing position of each observation region (position x) acquired in the n-th imaging. Next, in a case where, during the (n+1)-th (for example, second) imaging, the focusing position of the reference point 1 is Zn+1, 1, the focusing position of the reference point 2 is Zn+1, 2, and the focusing position of the reference point 3 is Zn+1, 3, a plane passing through these three focusing positions is obtained similarly to the n-th imaging. A focusing position in each observation region (position x) is linearly estimated from the plane, and the focusing position Zn+1, x after correction is acquired by adding the amount of Z displacement dn, x to this estimated value.

In addition, in the embodiment, an observation region is scanned by moving the stage 51. However, without being limited thereto, the observation region may be scanned by moving the imaging optical system 14 and other components relating to capture of a phase difference image with the stage 51 fixed, and the observation region may be scanned by moving both the stage 51, and the imaging optical system 14 and other components relating to capture of a phase difference image.

In addition, the embodiment has the present invention applied to a phase difference microscope, but the present invention may be applied to other microscopes such as a differential interference microscope and a bright field microscope without being limited to the phase difference microscope.

EXPLANATION OF REFERENCES

10: microscope device
11: white light source
12: capacitor lens
13: slit plate
14: imaging optical system
14a: phase difference lens
14b: objective lens
14c: phase plate
14d: imaging lens
15: imaging optical system driving unit
16: imaging element
17: horizontal direction driving unit
18: reference position detection unit
20: microscope control device
21: imaging controller
22: display controller
23: reference focusing position storage unit
30: display device
40: input device
50: culture vessel
51: stage
51a: opening
100: culture vessel
150: stage
CP: reference position
CP1-CP12: reference position
E: scanning end point
ED: end
FP1, FP2: focusing position
L: illumination light
M: scanning position of observation region
MK: hole portion
R1, R2: range of acceleration-deceleration region
S: scanning start point
W: well

What is claimed is:
1. An imaging device comprising:
an imaging unit that scans observation regions within a culture vessel in which an observation target is received and which is installed on a stage, and performs imaging of each observation region within the culture vessel; and
a controller that detects a focusing position of the observation region through auto-focus control, and controls the imaging unit to control imaging of the observation region on the basis of the detected focusing position,
wherein, in a case where the observation target is imaged multiple times over time by the imaging unit,
the controller detects the focusing position of the observation region within the culture vessel and focusing positions of a plurality of reference positions which are set in advance within the culture vessel through the auto-focus control in a case where first imaging is performed by the imaging unit, and performs the first imaging of each observation region using the detected focusing position, and
in a case where second imaging subsequent to the first imaging is performed by the imaging unit, the controller detects focusing positions of a plurality of reference positions which are set in advance within the culture vessel through the auto-focus control in advance to the second imaging, corrects a focusing position of each observation region detected in the first imaging on the basis of the detected focusing positions of the plurality of reference positions in advance to the second imaging and the focusing positions of the plurality of reference positions in the first imaging, and performs the second imaging using the corrected focusing position of each observation region.

2. The imaging device according to claim 1, further comprising, in a case where an observation target received in each of a plurality of the culture vessels is imaged multiple times over time, a reference focusing position storage unit that stores identification information of the culture vessel, a focusing position of an observation region detected in the first imaging of an observation target within a culture vessel identified by the identification information, and the focusing position of the reference position in the first imaging of the observation target in association with each other,
- wherein the controller acquires identification information of the culture vessel which is a target of the second imaging in a case where the second imaging is performed, reads out and acquires the focusing position of the observation region and the focusing position of the reference position stored in association with the acquired identification information from the reference focusing position storage unit, corrects the focusing position of the observation region on the basis of the acquired focusing position of the reference position and the focusing position of the reference position detected through the auto-focus control in advance to the second imaging, and performs the second imaging using the corrected focusing position of each observation region.

3. The imaging device according to claim 1,
- wherein in a case where third imaging subsequent to the second imaging is performed, the controller detects the focusing position of the reference position through the auto-focus control in advance to the third imaging, corrects a focusing position of each observation region acquired by correction in the second imaging on the basis of the detected focusing position in advance to the third imaging and the focusing position of the reference position used in the second imaging, and perform the third imaging using the corrected focusing position of each observation region.

4. The imaging device according to claim 2,
- wherein in a case where third imaging subsequent to the second imaging is performed, the controller detects the focusing position of the reference position through the auto-focus control in advance to the third imaging, corrects a focusing position of each observation region acquired by correction in the second imaging on the basis of the detected focusing position in advance to the third imaging and the focusing position of the reference position used in the second imaging, and perform the third imaging using the corrected focusing position of each observation region.

5. The imaging device according to claim 1,
- wherein the plurality of reference positions are set for each partial region within the culture vessel, and
- the controller corrects the focusing position of each observation region for each partial region.

6. The imaging device according to claim 2,
- wherein the plurality of reference positions are set for each partial region within the culture vessel, and
- the controller corrects the focusing position of each observation region for each partial region.

7. The imaging device according to claim 3,
- wherein the plurality of reference positions are set for each partial region within the culture vessel, and
- the controller corrects the focusing position of each observation region for each partial region.

8. The imaging device according to claim 4,
- wherein the plurality of reference positions are set for each partial region within the culture vessel, and
- the controller corrects the focusing position of each observation region for each partial region.

9. The imaging device according to claim 1, further comprising a reference position detection unit that detects the reference position,
- wherein the controller acquires the reference position detected by the reference position detection unit.

10. The imaging device according to claim 2, further comprising a reference position detection unit that detects the reference position,
- wherein the controller acquires the reference position detected by the reference position detection unit.

11. The imaging device according to claim 3, further comprising a reference position detection unit that detects the reference position,
- wherein the controller acquires the reference position detected by the reference position detection unit.

12. The imaging device according to claim 4, further comprising a reference position detection unit that detects the reference position,
- wherein the controller acquires the reference position detected by the reference position detection unit.

13. The imaging device according to claim 5, further comprising a reference position detection unit that detects the reference position,
- wherein the controller acquires the reference position detected by the reference position detection unit.

14. The imaging device according to claim 9,
- wherein the reference position detection unit detects an end of the culture vessel or an index provided in the culture vessel, and detects the reference position on the basis of the detection result.

15. The imaging device according to claim 14,
- wherein the index is a hole portion formed in the culture vessel or a marker attached to the culture vessel.

16. The imaging device according to claim 9,
- wherein the reference position detection unit detects the reference position on the basis of an image obtained by imaging the culture vessel.

17. The imaging device according to claim 1, further comprising a reference position acceptance unit that accepts a setting input of the reference position.

18. The imaging device according to claim 1,
- wherein the imaging unit comprises a phase difference microscope.

19. An imaging method comprising:
- scanning an observation region within a culture vessel in which an observation target is received and which is installed on a stage;
- detecting a focusing position of the observation region through auto-focus control; and
- performing imaging of the observation region on the basis of the detected focusing position,
- wherein, in a case where the observation target is imaged multiple times over time,
- the method includes
- detecting the focusing position of the observation region within the culture vessel and focusing positions of a plurality of reference positions which are set in advance within the culture vessel through the auto-focus control in a case where first imaging is performed, and
- performing the first imaging of each of the observation regions using the detected focusing position, and
- in a case where second imaging subsequent to the first imaging is performed, detecting focusing positions of a plurality of reference positions which are set in advance within the culture vessel through the auto-focus control in advance to the second imaging, correcting the focusing position of each observation region detected in the first imaging on the basis of the detected focusing positions of the plurality of reference positions in advance to the second imaging and the focusing positions of the plurality of the reference positions in the first imaging, and performing the second imaging using the corrected focusing position of each observation region.

20. A non-transitory computer readable recording medium storing an imaging control program causing a computer to execute a procedure of scanning an observation region within a culture vessel in which an observation target is received and which is installed on a stage, a procedure of detecting a focusing position of the observation region through auto-focus control, and a procedure of performing imaging of the observation region on the basis of the detected focusing position, wherein, in a case where the observation target is imaged multiple times over time, the program causes the computer to execute a procedure of detecting the focusing position of the observation region within the culture vessel and focusing positions of a plurality of reference positions which are set in advance within the culture vessel through the auto-focus control in a case where first imaging is performed, and a procedure of performing the first imaging of each of the observation regions using the detected focusing position, and in a case where second imaging subsequent to the first imaging is performed, the program causes the computer to execute, a procedure of detecting focusing positions of a plurality of reference positions which are set in advance within the culture vessel through the auto-focus control in advance to the second imaging a procedure of correcting the focusing position of each observation region detected in the first imaging on the basis of the detected focusing positions of the plurality of reference positions in advance to the second imaging and the focusing positions of the plurality of the reference positions in the first imaging, and a procedure of performing the second imaging using the corrected focusing position of each observation region.

* * * * *